Jan. 30, 1968   A. G. DEAN   3,366,203
CONTROLLED VENTILATION FOR DISC BRAKES
Filed Dec. 2, 1966
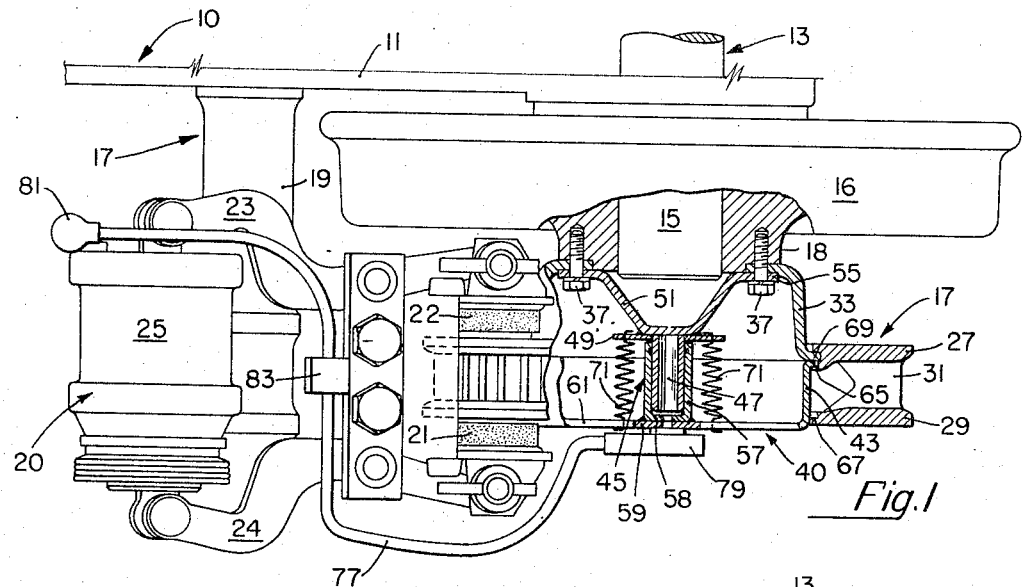
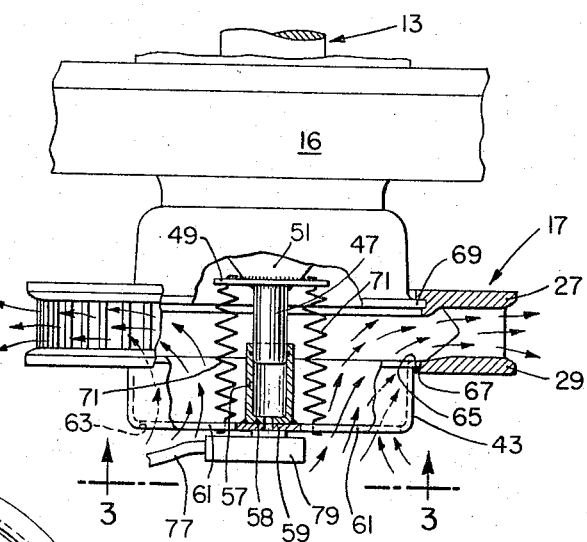
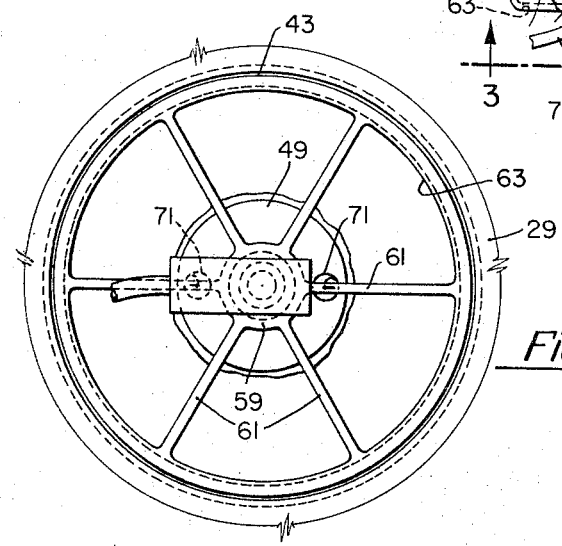
INVENTOR.
ALBERT G. DEAN
BY
William R. Nolte
AGENT

United States Patent Office 3,366,203
Patented Jan. 30, 1968

1

3,366,203
CONTROLLED VENTILATION FOR DISC BRAKES
Albert G. Dean, Narberth, Pa., assignor to The Budd Company, Philadelphia, Pa., a corporation of Pennsylvania
Filed Dec. 2, 1966, Ser. No. 598,802
5 Claims. (Cl. 188—264)

This invention relates to improved ventilated disc brake apparatus for railway cars, and more particularly, to such apparatus for controlling the air flows through such ventilated discs.

An apparatus for control of air flow through dual discs attached to railway car wheels to prevent loss of power due to movement of air through the disc at high speeds of rotation. The dual discs, which are separated by cooling fins are provided with shield means and moved by actuator means to one position to block the flow of air through the discs, and to another position to admit air therethrough thereby dissipating the heat energy due to braking operations.

It has been found that the energy required to produce high volumes of air moving through a ventilated brake disc is noticeable at speeds above 100 m.p.h. At speeds up to 160 m.p.h. as contemplated on the present New York-Washington high-speed passenger railroad projects, the energy required would be significant. High volumes of air nevertheless are required to obtain maximum steady state energy dissipation and minimum cool down time for the brake discs. As an example of the energy dissipation required, it may be noted that at 160 m.p.h. the kinetic energy of a 172,000 lb. railway passanger car is about 147 million foot lbs. or 188,000 B.t.u.'s and at 120 m.p.h., about 80 million foot lbs. or 106,000 B.t.u.'s. This necessitates that the brake discs be of unusually sturdy and efficient design to accommodate the severe braking loads which are applied.

By contrast unsatisfactory results have been obtained in an arrangement embodying the use of tread brake units applied directly to the wheels. The repeated brake operations have produced heat-checking failure in such wheels due to the intense heat produced. A further arrangement, embodying the use of single wide cast iron disc per axle, though capable of handling emergency braking loads, has likewise been found unsatisfactory in its inability to handle the heavy duty loads imposed during repeated duty cycles of operation.

It is therefore the principal object of this invention to provide an improved disc brake apparatus which avoids one or more of the disadvantages of the prior art arrangements.

It is a further object of this invention to provide an improved disc brake apparatus which controls the air flow through the ventilated disc during the time braking forces are applied to the disc, and during its running operation thereof.

In accordance with the invention, a conventional ventilated brake disc assembly is mounted on a well known wheel and axle unit of a truck. The disc assembly includes a pair of circular discs which are disposed inboard and outboard of and separated by a plurality of fins. Closure means are provided adjacent the air intake area of the disc assembly provided to monitor the air flow generated between the inboard and outboard discs to govern the amount of horsepower required to drive the disc assembly as required at the various speed ranges and braking demands of the car.

For a better understanding of the invention, together with other and further objects thereof, reference is had to the following description taken in connection with the accompanying drawing and its scope will be pointed out in the appended claims.

2

In the drawing, FIG. 1 is a top plan view of a portion of a railway passenger car truck partially in section embodying the invention;

FIG. 2 is a view similar to FIG. 1, and showing the air flow control means in another position from that shown in FIG. 1;

FIG. 3 is an elevational view taken along the line 3—3 of FIG. 2.

Referring now to the drawings, the invention is illustrated as applied to a railway passenger car truck 10 only a portion of which is shown having a pair of side frames 11, which in turn are supported by a pair of wheel axle units 13. Each of these units comprise an axle 15 and a pair of laterally spaced wheels 16. The truck may be similar to the configuration described and claimed in the patent to W. B. Dean, entitled Railway Car Truck, filed October 13, 1959, Patent No. 2,908,230 and assigned to the same assignee as the present invention.

Each wheel 16 of axle unit 13 has associated therewith a ventilated brake disc assembly 17 which is fixedly secured to the hub 18 of the wheel. A bracket assembly 19 mounted on truck side frame 11 supports a unit brake assembly 20, comprising brake shoes 21, 22, a pair of brake tongue levers 23, 24 and a brake actuator 25. The brake shoes 21, 22 engage disc assembly 17 which includes a pair of annular face discs 27 inboard, 29 outboard, connected in spaced apart relationship by a plurality of cooling fins 31 extending therebetween. The fins 31 are flat, and are radially spaced to provide a plurality of air passages between the fins, through which air flows to cool the fins and the discs. A flanged hub plate 33 connected at its outer periphery to inboard disc 27 is secured at its inner periphery to the hub 18 of wheel 16 by bolts 37 in a manner to rotate the disc faces 27, 29 at right angles to the axis of axle 15. The hub plate prevents air from coming in from the side of the disc face 27 and flowing through fins 31 and discs 27, 29. Normally the energy required to produce a flow of moving air through the ventilated disc assembly 17 is relatively insignificant at slow speeds of a passenger car; however, at high r.p.m. the energy required to obtain maximum thermal capacity and minimum cool down time for the most frequent duty cycle of brake application becomes significant.

In accordance with the invention, air flow control means 40 are provided to govern the amount of horsepower required to drive the ventilated disc assembly 17 at various speed ranges and braking demands. For this purpose a cylindrical sleeve member 43 is mounted for axial movement relative to the ventilated disc assembly 17. Pneumatic actuator means 45 disposed along the axis of rotation of the disc assembly is provided to move the cylindrical sleeve member 43 from its air flow blocking position as shown in FIG. 1 to an open position or distended position shown in FIG. 2, permitting air flow as seen by the direction of the arrows through the opposed disc plates 27, 29 and fins 31 of the assembly 17. The actuator means 45 include a stationary, elongated piston 47, having one of its ends secured to one surface of a plate 49 of larger diameter than the bore of the piston. The other surface of the plate is in turn secured to the central flattened web 53 or dished member 51. The latter member includes a peripheral flange 55 which is likewise secured to the hub 18 of wheel 16, by the aforementioned bolts 37. The actuator includes a cylinder 57 which mates with piston 47 and which is movable axially outwardly from its retracted position FIG. 1 to its extended position shown in FIG. 2. The outer end of the cylinder includes an end wall 58 which is secured to the inner face of hub portion 59 of the air blocking cylinder means 40. Spokes 61 extend radially outwardly from hub 59 and are connected with outer marginal edge portion 63 of cylindrical sleeve member 43. The opposite marginal edge of the sleeve includes an outwardly turned flange or abutment 65 which engages shoulder 67 at the inner periphery of disc 29 in the extended position of the apparatus and correspondingly abuts the out-turned flange 69 of hub mounting plate 33. A plurality of springs 71, each attached at one of its ends to circular plate 49 and at its other end a spoke 61, are effective to restore the cylinder 43 from its open, air-admitting position shown in FIG. 2 to its closed position of FIG. 1. The cylindrical sleeve 43 thus rotates in unison with wheel 16 and the ventilated disc brake assembly 17.

An air line 77 containing a suitable supply of air under pressure is connected to a rotary fitting 79 to supply air to the actuator cylinder 45. The rotary air fitting may be of conventional construction and automatically adjusts to variations in line pressure and seals at either high speeds of rotation of the wheels or when the same are stopped. The opposite end of the line 77 is shown connected to the input fitting 81 of the brake actuator 25 of FIG. 1. Thus when a braking action is applied through actuator 25 the air flow control actuator is likewise actuated to move the air flow control cylinder 40 to its open position, shown in FIG. 2 to enable rapid dissipation of the heat generated during the application of the brakes. A delayed release means 83 affixed to tong bracket support 85, FIG. 1 may be incorporated in supply line 77 to permit the flow of air through the disc assembly to continue during acceleration or running after a braking application has been made. The delayed release valve means will prevent the compounding of brake disc temperatures in the event that frequent braking applications are successively required within a short period of time.

While there has been described what at present is considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. In braking apparatus for a railway car wheel having disc means accommodating air-flow therethrough and associated brake means coacting therewith, the combination comprising, air flow control means associated with said brake disc means, said air flow control means including cylindrical plate means movable axially of said brake disc to one position to block air from flowing through said disc means and in another position thereof to admit air for passage through said disc means, and actuator means connected with said air flow control means to adjust the same between said one position of adjustment and said another position.

2. In the brake apparatus set forth in claim 1 wherein said actuator means are mounted concentrically within said brake disc means.

3. In the construction set forth in claim 1 wherein said actuator means comprise pneumatic cylinder means mounted on the hub of said wheel.

4. In the construction set forth in claim 3 wherein said pneumatic means include a stationary piston and a supporting dished member mounted to the hub of said wheel, and a movable cylinder engaging said air flow control means.

5. In the braking apparatus set forth in claim 4 wherein said cylindrical plate means includes radially inwardly extending spoke portions defining openings to admit air therethrough and wherein said actuator means include spring means secured to said spoke portions.

References Cited

UNITED STATES PATENTS 2,198,027  4/1940  Farmer _____ 188—264
2,198,028  4/1940  Farmer _____ 188—264

FERGUS S. MIDDLETON, *Primary Examiner.*

G. E. HALVOSA, *Assistant Examiner.*